(12) United States Patent
Warnakulasuriya

(10) Patent No.: US 10,018,289 B2
(45) Date of Patent: Jul. 10, 2018

(54) ELONGATE TAPE ELEMENT AND METHOD

(71) Applicant: GE Oil & Gas UK Limited, Bristol (GB)

(72) Inventor: Suranjith Warnakulasuriya, Nottingham (GB)

(73) Assignee: GE OIL & GAS UK LIMITED, Bristol (GB)

( * ) Notice: Subject to any disclaimer, the term of this patent is extended or adjusted under 35 U.S.C. 154(b) by 42 days.

(21) Appl. No.: 14/783,807

(22) PCT Filed: Apr. 11, 2014

(86) PCT No.: PCT/GB2014/051138
§ 371 (c)(1),
(2) Date: Oct. 9, 2015

(87) PCT Pub. No.: WO2014/167349
PCT Pub. Date: Oct. 16, 2014

(65) Prior Publication Data
US 2016/0069485 A1    Mar. 10, 2016

(30) Foreign Application Priority Data

Apr. 12, 2013 (GB) .................................. 1306665.9

(51) Int. Cl.
*F16L 11/16* (2006.01)
*F16L 11/14* (2006.01)
(Continued)

(52) U.S. Cl.
CPC ............ *F16L 11/14* (2013.01); *B21C 37/121* (2013.01); *B21C 37/124* (2013.01);
(Continued)

(58) Field of Classification Search
CPC ....... F16L 11/081; F16L 11/082; F16L 11/083
(Continued)

(56) References Cited

U.S. PATENT DOCUMENTS

| 846,996 A | 3/1907 | Greenfield |
| 4,062,380 A | 12/1977 | Hofle |

(Continued)

FOREIGN PATENT DOCUMENTS

| AU | 646477 | 2/1994 |
| CN | 1039196 | 1/1990 |

(Continued)

OTHER PUBLICATIONS

Search Report for App No. PCT/GB2014/051138 dated Oct. 30, 2014, 7 pages.

(Continued)

*Primary Examiner* — Patrick F Brinson
(74) *Attorney, Agent, or Firm* — Knobbe Martens Olson and Bear, LLP

(57) ABSTRACT

An elongate tape element, a flexible pipe body and method of producing a flexible pipe body are disclosed. The tape element (508) has a cross-sectional profile comprising a body portion (510) for being positioned between collapse resistant tape windings (501) such that each body portion (510) lies at least partially in a gap (512) between adjacent collapse resistant tape windings (501); and at least one wing portion (516) extending from an end region of the body portion, the at least one wing portion configured to span the gap and respectively abut with a radially inner surface of an adjacent collapse resistant tape winding.

6 Claims, 10 Drawing Sheets

(51) Int. Cl.
*F16L 11/08* (2006.01)
*B21C 37/12* (2006.01)
*F16L 57/02* (2006.01)
*B29C 53/04* (2006.01)
*B29L 9/00* (2006.01)
*B29L 23/00* (2006.01)

(52) U.S. Cl.
CPC .......... *B21C 37/126* (2013.01); *B29C 53/043* (2013.01); *F16L 11/082* (2013.01); *F16L 11/083* (2013.01); *F16L 11/16* (2013.01); *F16L 57/02* (2013.01); *B29L 2009/00* (2013.01); *B29L 2023/22* (2013.01)

(58) Field of Classification Search
USPC .................. 138/135, 134, 139, 130, 132
See application file for complete search history.

(56) References Cited

U.S. PATENT DOCUMENTS

| | | | |
|---|---|---|---|
| 4,304,266 A | 12/1981 | Kutnyak et al. | |
| 4,597,276 A | 7/1986 | Legallais | |
| 4,800,928 A * | 1/1989 | Kanao | F16L 11/16 138/122 |
| 5,669,420 A | 9/1997 | Herrero et al. | |
| 5,934,335 A * | 8/1999 | Hardy | F16L 11/083 138/129 |
| 6,024,135 A | 2/2000 | Nobileau | |
| 6,065,501 A * | 5/2000 | Feret | F16L 11/082 138/133 |
| 6,085,798 A * | 7/2000 | Le Nouveau | F16L 11/081 138/125 |
| 6,192,941 B1 * | 2/2001 | Mallen-Herrero | F16L 11/083 138/135 |
| 6,354,333 B1 * | 3/2002 | Dupoiron | F16L 11/081 138/129 |
| 6,840,286 B2 * | 1/2005 | Espinasse | F16L 11/083 138/135 |
| 6,889,718 B2 * | 5/2005 | Glejbøl | F16L 11/16 138/133 |
| 7,318,454 B2 * | 1/2008 | Dupoiron | F15D 1/065 138/134 |
| 2001/0003992 A1 * | 6/2001 | Espinasse | F16L 11/08 138/135 |
| 2002/0129862 A1 | 9/2002 | Hupertz | |
| 2003/0070719 A1 | 4/2003 | Philippe et al. | |
| 2004/0074553 A1 * | 4/2004 | Espinasse | F16L 11/083 138/135 |
| 2004/0154677 A1 | 8/2004 | Coutarel | |
| 2004/0182462 A1 * | 9/2004 | Glejbol | F16L 11/16 138/135 |
| 2004/0221907 A1 | 11/2004 | Glejbol et al. | |
| 2013/0014849 A1 | 1/2013 | Glejbol | |

FOREIGN PATENT DOCUMENTS

| | | |
|---|---|---|
| CN | 1420973 | 5/2003 |
| CN | 1922428 | 2/2007 |
| CN | 102272504 | 12/2011 |
| DE | 349051 | 2/1922 |
| EP | 1826468 | 8/2007 |
| EP | 2857115 | 4/2015 |
| GB | 468476 | 7/1937 |
| GB | 1081339 | 8/1967 |
| GB | 1213851 | 11/1970 |
| WO | WO 2004/005785 | 1/2004 |
| WO | WO 2004/111514 | 12/2004 |
| WO | WO 2010/064026 | 12/2004 |
| WO | WO 2011/092440 | 8/2011 |
| WO | WO 2011/141033 | 11/2011 |
| WO | WO 2012/097817 | 7/2012 |
| WO | WO 2012/131354 | 10/2012 |
| WO | WO 2013/098548 | 7/2013 |
| WO | WO 2014/000816 | 1/2014 |
| WO | WO 2014/023515 | 2/2014 |
| WO | WO 2014/023516 | 2/2014 |
| WO | WO 2014/167346 | 10/2014 |
| WO | WO 2015/121316 | 8/2015 |
| WO | WO 2015/121424 | 8/2015 |

OTHER PUBLICATIONS

Popescu, M. et al. (2011) "Flow-Induced Acoustics in Corrugated Pipes", *Communications in Computational Physics*, vol. 10, N. 1, pp. 120-139.

Nielsen, K.G. et al. (2011) "Application of a New Wire Carcass Design for Prevention of Singing Behaviour in Flexible Risers" *Offshore Technology Conference*, p. 3262-2371.

* cited by examiner

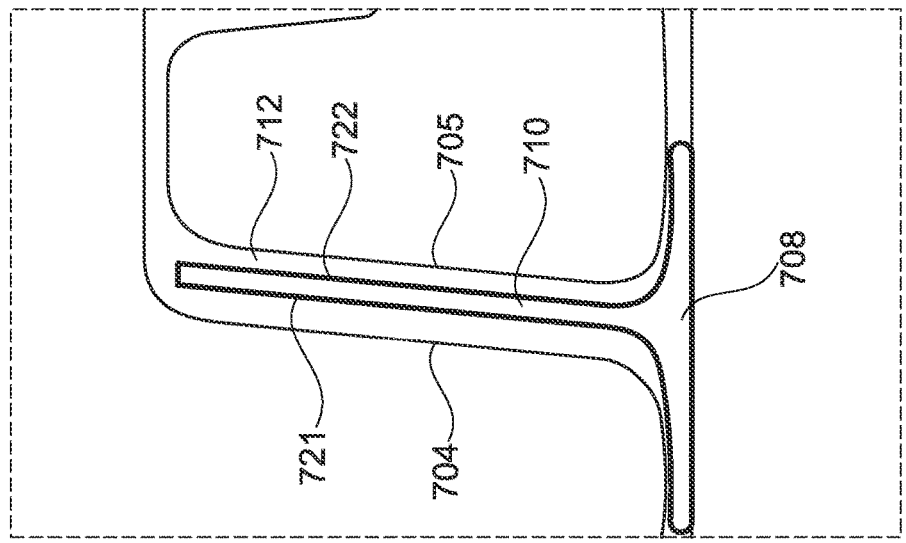
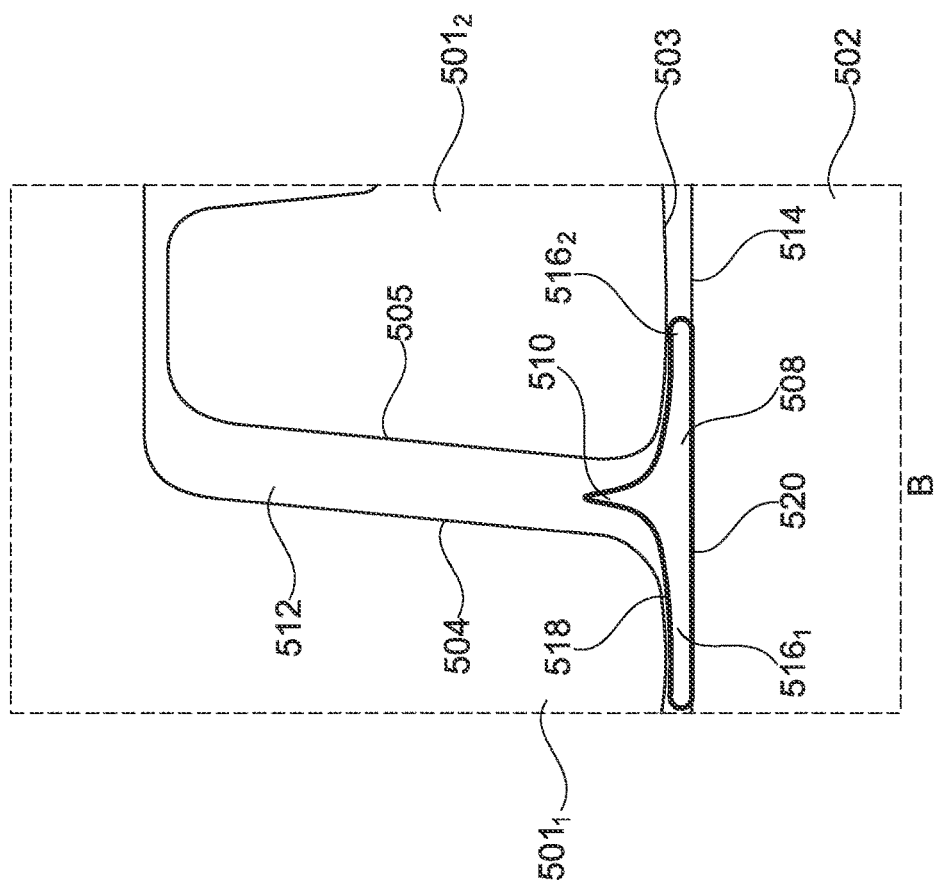

ELONGATE TAPE ELEMENT AND METHOD

The present invention relates to an elongate tape element and method of forming a flexible pipe body. In particular, but not exclusively, the present invention relates to a tape element for use in forming an armour layer of a flexible pipe body.

Traditionally flexible pipe is utilised to transport production fluids, such as oil and/or gas and/or water, from one location to another. Flexible pipe is particularly useful in connecting a sub-sea location (which may be deep underwater, say 1000 meters or more) to a sea level location. The pipe may have an internal diameter of typically up to around 0.6 meters (e.g. diameters may range from 0.05 m up to 0.6 m). Flexible pipe is generally formed as an assembly of a flexible pipe body and one or more end fittings. The pipe body is typically formed as a combination of layered materials that form a pressure-containing conduit. The pipe structure allows large deflections without causing bending stresses that impair the pipe's functionality over its lifetime. The pipe body is generally built up as a combined structure including polymer, and/or metallic, and/or composite layers. For example, a pipe body may include polymer and metal layers, or polymer and composite layers, or polymer, metal and composite layers.

In many known flexible pipe designs the pipe body includes one or more pressure armour layers. The primary load on such layers is formed from radial forces. Pressure armour layers often have a specific cross section profile to interlock so as to be able to maintain and absorb radial forces resulting from outer or inner pressure on the pipe. The cross sectional profile of the wound wires which thus prevent the pipe from collapsing or bursting as a result of pressure are sometimes called pressure-resistant profiles. When pressure armour layers are formed from helically wound wired forming hoop components, the radial forces from outer or inner pressure on the pipe cause the hoop components to expand or contract, putting a tensile load on the wires.

Unbonded flexible pipe has been used for deep water (less than 3,300 feet (1,005.84 meters)) and ultra deep water (greater than 3,300 feet) developments. It is the increasing demand for oil which is causing exploration to occur at greater and greater depths where environmental factors are more extreme. For example in such deep and ultra-deep water environments ocean floor temperature increases the risk of production fluids cooling to a temperature that may lead to pipe blockage. Increased depths also increase the pressure associated with the environment in which the flexible pipe must operate. For example, a flexible pipe may be required to operate with external pressures ranging from 0.1 MPa to 30 MPa acting on the pipe. Equally, transporting oil, gas or water may well give rise to high pressures acting on the flexible pipe from within, for example with internal pressures ranging from zero to 140 MPa from bore fluid acting on the pipe. As a result the need for high levels of performance from the pressure armour and tensile armour layers of the flexible pipe body is increased.

Flexible pipe may also be used for shallow water applications (for example less than around 500 meters depth) or even for shore (overland) applications.

One way to improve the load response and thus performance of armour layers is to manufacture the layers from thicker and stronger and thus more robust materials. For example for pressure armour layers in which the layers are often formed from wound wires with adjacent windings in the layer interlocking, manufacturing the wires from thicker material results in the strength increasing appropriately. However, as more material is used the weight of the flexible pipe increases. Ultimately the weight of the flexible pipe can become a limiting factor in using flexible pipe. Additionally manufacturing flexible pipe using thicker and thicker material increases material costs appreciably, which is also a disadvantage.

In addition, with certain pressure-resistant profiles, layers adjacent to the pressure armour layer may become damaged, in particular when the material of the adjacent layer moves into gaps between adjacent windings of the pressure armour layer.

In accordance with industry regulations, all flexible pipe structures must undergo a factory acceptance test (FAT) prior to sale. This involves pressurising a pipe bore with a fluid such as water at 1.5 times the usual pressure of use. The water is thus a pressurising medium.

The application of internal pressure (i.e. pressure from within the bore) to the pipe produces radial expansion in all layers and this is when a polymer layer undergoes deformation and tends to creep into the gaps of an overlying armour layer. At high pressures (about 8000 psi/55 MPa or more), the resultant strain distribution within the polymer layer can be highly localised at the areas around the gaps, and the polymer material may deform by cavitation rather than plastic flow. This can in turn result in the formation of microcrazing or microcracking on the radially inner surface of the polymer layer. During any subsequent loading (such as the loading experienced during normal use in transporting production fluids) this microcrazing may then extend to form longer/deeper cracks throughout the polymer layer. This increases the risk of failure of the polymer layer and may ultimately lead to loss of pressure containment, having an adverse effect on the lifetime of a flexible pipe.

WO98/16770, WO2009/087348, WO2010/055323, US2004/0182462, US2010/0059134, U.S. Pat. No. 6,739,355, U.S. Pat. No. 5,275,209, U.S. Pat. No. 6,192,941, U.S. Pat. No. 6,283,161, U.S. Pat. No. 6,065,501, EP1141606, EP1395769 and U.S. Pat. No. 4,549,581 disclose armour layer windings with various shaped cross-sections.

According to a first aspect of the present invention there is provided an elongate tape element for forming a helically wound layer of windings in a flexible pipe body, the tape being configured for alternate winding with a collapse resistant tape in a helical manner to form a collapse resistant layer, wherein the tape element has a cross-sectional profile comprising:
  a body portion for being positioned between collapse resistant tape windings such that each body portion lies at least partially in a gap between adjacent collapse resistant tape windings; and
  at least one wing portion extending from an end region of the body portion, the at least one wing portion configured to span the gap and respectively abut with a radially inner surface of an adjacent collapse resistant tape winding.

According to a second aspect of the present invention there is provided a flexible pipe body for transporting fluids from a subsea location comprising:
  a fluid retaining layer;
  an armour layer comprising
a collapse resistant tape helically wound around the fluid retaining layer wherein adjacent windings of the tape interlock such that a gap is present between adjacent windings, and
an elongate tape element alternately wound with the collapse resistant tape in a helical manner to form the armour layer such that the elongate tape element is located at least partially within said gap and configured to span the gap, and arranged in an abutting relationship with said fluid retaining layer.

According to a third aspect of the present invention there is provided a method of manufacturing a flexible pipe body, comprising:

providing a fluid retaining layer; and helically winding an elongate tape element and a collapse resistant tape over the fluid retaining layer to form alternate windings, wherein the elongate tape element is located at least partially within a gap between adjacent collapse resistant tape windings and configured to span the gap so as to abut with a radially inner surface of each adjacent collapse resistant tape winding.

Certain embodiments of the invention provide the advantage that tape elements may be helically wound to form windings of an armour layer, such that layers beneath (radially inwards) the armour layer are not subject to large variations in contact stress and strain in the layers.

Certain embodiments of the invention provide the advantage that abrupt strain variation in an adjacent polymer barrier layer or liner is reduced or prevented.

Certain embodiments of the invention provide a bridging element for winding between armour wires to form an armour layer. A flexible pipe body can be produced having an armour layer and a radially inner polymer barrier layer or liner. With such a bridging element, the contact stresses between the polymer layer and the armour layer are substantially uniform.

Certain embodiments of the invention provide the advantage that a flexible pipe body is provided that has improved performance and lifetime span. In particular, the possibility of burst-through of a fluid retaining layer is averted.

Embodiments of the invention are further described hereinafter with reference to the accompanying drawings, in which:

FIG. 6 illustrates an enlarged view of the section B shown in FIG. 5;

FIG. 7 illustrates an alternative embodiment of the present invention;

In the drawings like reference numerals refer to like parts.

Figure 1:
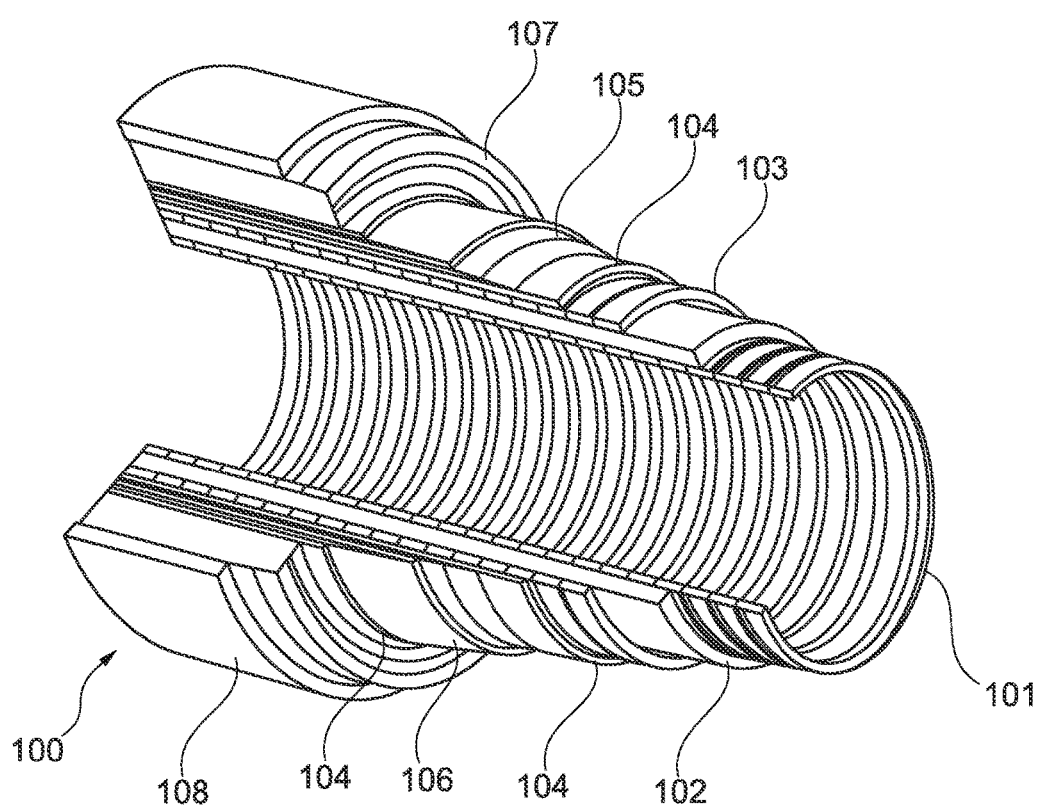
FIG. 1 illustrates a flexible pipe body.

Throughout this description, reference will be made to a flexible pipe. It will be understood that a flexible pipe is an assembly of a portion of pipe body and one or more end fittings in each of which a respective end of the pipe body is terminated. FIG. 1 illustrates how pipe body 100 is formed in accordance with an embodiment of the present invention from a combination of layered materials that form a pressure-containing conduit. Although a number of particular layers are illustrated in FIG. 1, it is to be understood that the present invention is broadly applicable to coaxial pipe body structures including two or more layers manufactured from a variety of possible materials. It is to be further noted that the layer thicknesses are shown for illustrative purposes only. As used herein, the term "composite" is used to broadly refer to a material that is formed from two or more different materials, for example a material formed from a matrix material and reinforcement fibres.

As illustrated in FIG. 1, a pipe body includes an optional innermost carcass layer 101. The carcass provides an interlocked construction that can be used as the innermost layer to prevent, totally or partially, collapse of an internal pressure sheath 102 due to pipe decompression, external pressure, and tensile armour pressure and mechanical crushing loads. The carcass layer is often a metallic layer, formed from stainless steel, for example. The carcass layer may also be formed from composite, polymer, or other material, or a combination of materials. It will be appreciated that certain embodiments of the present invention are applicable to 'smooth bore' operations (i.e. without a carcass) as well as such 'rough bore' applications (with a carcass).

The internal pressure sheath 102 acts as a fluid retaining layer and comprises a polymer layer that ensures internal fluid integrity. It is to be understood that this layer may itself comprise a number of sub-layers. It will be appreciated that when the optional carcass layer is utilised the internal pressure sheath is often referred to by those skilled in the art as a barrier layer. In operation without such a carcass (so-called smooth bore operation) the internal pressure sheath may be referred to as a liner.

An optional pressure armour layer 103 is a pressure resistant layer that provides a structural layer that increases the resistance of the flexible pipe to internal and external pressure and mechanical crushing loads. The layer also structurally supports the internal pressure sheath, and typically may be formed from an interlocked construction of wires wound with a lay angle close to 90°. The pressure armour layer is often a metallic layer, formed from carbon steel, for example. The pressure armour layer could also be formed from composite, polymer, or other material, or a combination of materials.

The flexible pipe body also includes an optional first tensile armour layer 105 and optional second tensile armour layer 106. Each tensile armour layer is used to sustain tensile loads and internal pressure. The tensile armour layer is often formed from a plurality of wires (to impart strength to the layer) that are located over an inner layer and are helically wound along the length of the pipe at a lay angle typically between about 10° to 55°. The tensile armour layers are often counter-wound in pairs. The tensile armour layers are often metallic layers, formed from carbon steel, for example. The tensile armour layers could also be formed from composite, polymer, or other material, or a combination of materials.

The flexible pipe body shown also includes optional layers of tape 104 which help contain underlying layers and to some extent prevent abrasion between adjacent layers. The tape layer may be a polymer or composite or a combination of materials.

The flexible pipe body also typically includes optional layers of insulation 107 and an outer sheath 108, which comprises a polymer layer used to protect the pipe against penetration of seawater and other external environments, corrosion, abrasion and mechanical damage.

Each flexible pipe comprises at least one portion, sometimes referred to as a segment or section of pipe body 100 together with an end fitting located at at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

Figure 2:
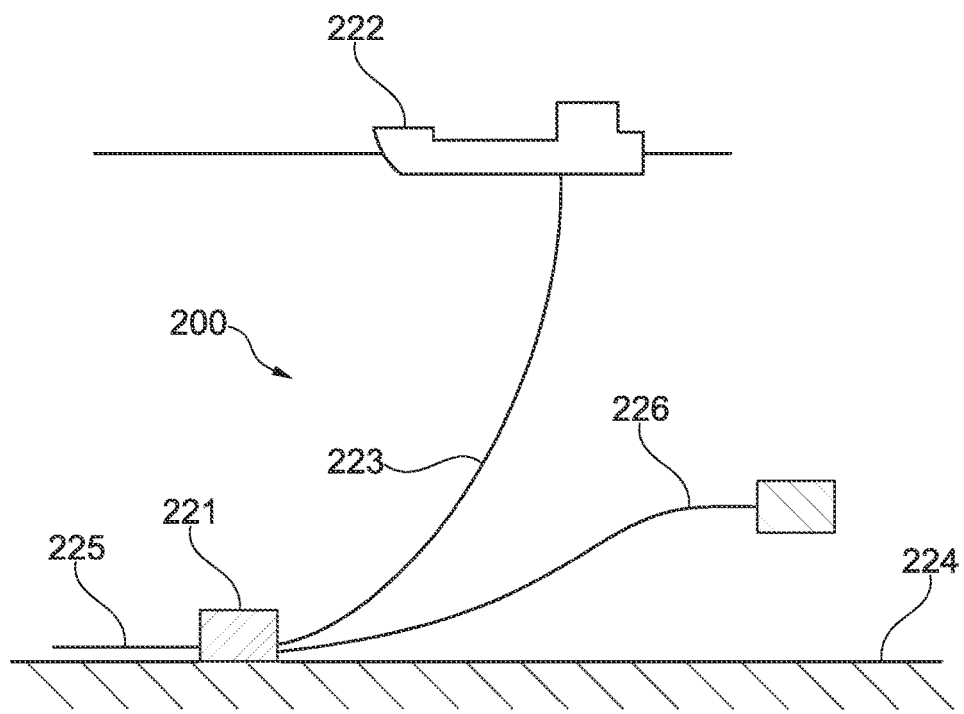
FIG. 2 illustrates a riser assembly.

FIG. 2 illustrates a riser assembly 200 suitable for transporting production fluid such as oil and/or gas and/or water from a sub-sea location 221 to a floating facility. For example, in FIG. 2 the sub-sea location 221 includes a sub-sea flow line. The flexible flow line 225 comprises a flexible pipe, wholly or in part, resting on the sea floor 224 or buried below the sea floor and used in a static application. The floating facility may be provided by a platform and/or buoy or, as illustrated in FIG. 2, a ship 222. The riser assembly 200 is provided as a flexible riser, that is to say a flexible pipe 223 connecting the ship to the sea floor installation. The flexible pipe may be in segments of flexible pipe body with connecting end fittings.

It will be appreciated that there are different types of riser, as is well-known by those skilled in the art. Embodiments of the present invention may be used with any type of riser, such as a freely suspended (free, catenary riser), a riser restrained to some extent (buoys, chains), totally restrained riser or enclosed in a tube (I or J tubes).

FIG. 2 also illustrates how portions of flexible pipe can be utilised as a flow line 225 or jumper 226.

Figure 3:
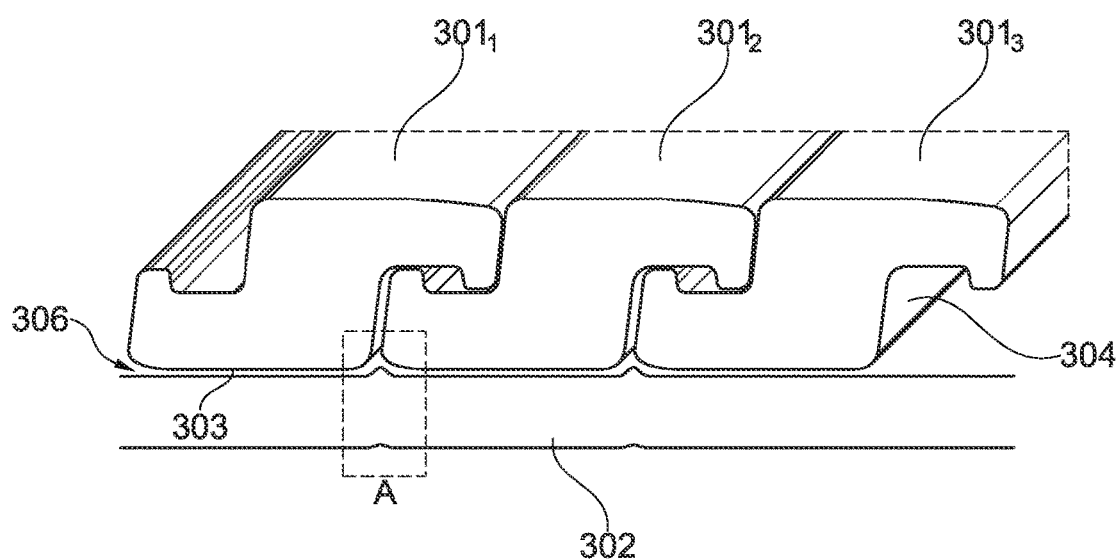
FIG. 3 illustrates a portion of a known flexible pipe body.
Figure 4:
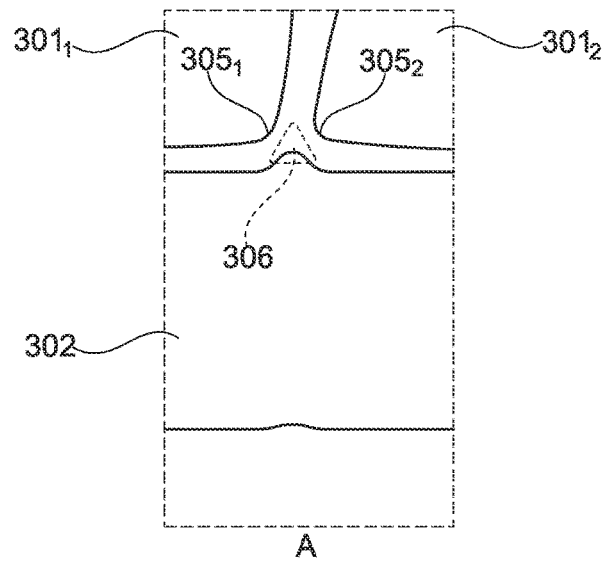
FIG. 4 illustrates an enlarged view of the section A shown in FIG. 3.

FIG. 3 illustrates a portion of a known flexible pipe body including windings $301_{1-3}$ of a pressure armour layer and a radially inner polymer fluid retaining layer 302. FIG. 4 shows an enlarged view of section A of FIG. 3. As a tape is wound to form the pressure armour layer, an inner surface 303 of the pressure armour layer is formed from one edge of the tape profile by the repeated, adjacent windings. Of course, a single tape may be wound as a repeated winding (as shown in FIG. 3), or several tapes, possibly of different profiles, may be successively wound, with one edge of each tape profile forming the inner surface of the armour layer. Either way, a base contact surface of each profile forms an inner surface 303 of the armour layer.

In the regions where successive windings come together, along the length of the edges 304 of each winding, it is usually the case that the edge of the tape profile forming the inner (base) surface curves away from the base towards each side wall of the tape profile at a small, constant radius of curvature $305_1$. Similarly, an adjacent winding will also curve away from the inner surface towards a side wall at a small, constant radius of curvature $305_2$. This leaves a very approximate triangle shape of space 306 between the adjoining windings and the adjacent, radially inner layer, e.g. the polymer barrier layer 302. In this region 306, it has been found that the underlying layers, e.g. polymer barrier layer 302 and/or intermediate polymer sacrificial layer (not shown), may creep into these triangles of space. This is because the high internal pressure from fluids conveyed through the pipe force the radially inner layers towards the pressure armour layer and into the spaces between the windings. This causes localised regions where part of the polymer layer is in contact with the base of the pressure armour layer and part of the polymer that is unsupported and forced into the gap between windings. In this localised region where the windings come together, the abrupt change in support to the layers underlying the pressure armour layer causes high shear and strain to the material of those underlying layers. This may result in cracking or micro-crazing.

In flexible pipes the layers underlying the pressure armour layer are often polymer layers, for example PVDF (polyvinylidene fluoride) although it will be appreciated that many materials may be suitable, e.g. polymers, metals, or composites. A suitable material may be chosen by the pipe designer to match the conditions of use of the pipe. However, most materials will have a certain maximum allowable strain above which the risk of damage to the material is much greater. As such, the presence of the above-described gaps between windings of a pressure armour layer can lead to potential damage and potential failure in the underlying layers. When an area of polymer is under strain, the properties of that area may be changed such that it becomes weaker. In areas of strain, the polymer is more easily deformed than the surrounding material, causing an even higher level of strain in the polymer, which can result in a plastic hinge effect.

As can be seen in FIGS. 3 and 4, there is a gap extending between each winding $301_{1-3}$ of the pressure armour layer, e.g. between the opposing facing surfaces of winding $301_1$ and $301_2$. This gap may typically be between around 0 and 3 mm, for example, in a pressure armour layer. As is known in the art this gap allows the windings to move together or further apart to accommodate bending or movement of the pipe.

Figure 5:
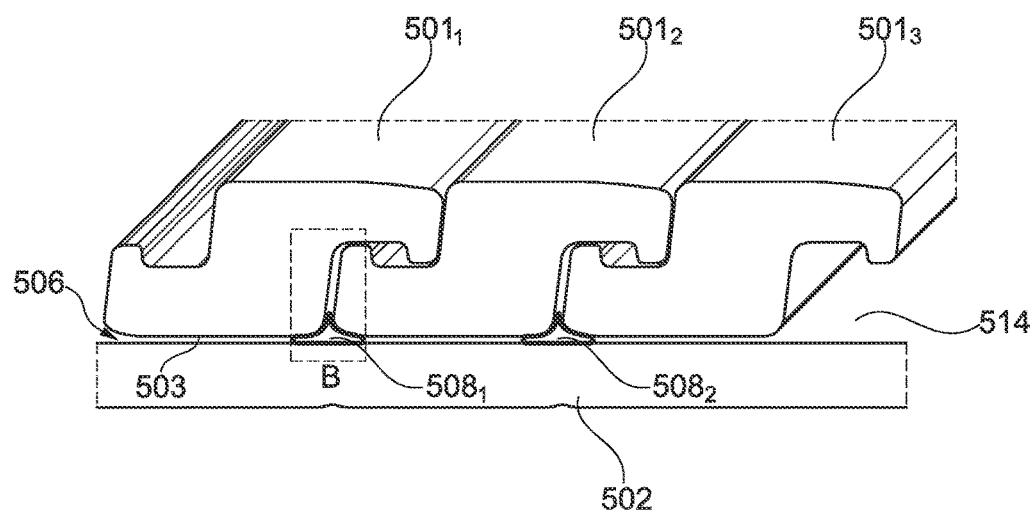
FIG. 5 illustrates a portion of flexible pipe according to the present invention.

FIG. 5 illustrates a portion of a flexible pipe body including an elongate tape element according to an embodiment the present invention. The flexible pipe body includes windings $501_{1-3}$ of a pressure armour layer, a radially inner fluid retaining layer 502 and an elongate tape element (bridging element) $508_{1,2}$ located in a space 506 between edges 504, 505 of adjacent windings 501 and between an inner surface 503 of the pressure armour layer and a radially outer surface 514 of the fluid retaining layer 502. FIG. 6 shows an enlarged view of section B of FIG. 5. Here, the bridging element $508_{1,2}$ is a continuous, relatively fine, metallic, elongate tape and is helically wound over the fluid retaining layer 502 between each successive winding of pressure armour tape (collapse resistant tape). That is, the bridging element is configured to be alternately wound with the pressure armour tape such that in cross section, windings of the bridging element alternate with windings of the pressure armour tape. Aptly the elastic modulus of the metallic material of the bridging element could be 170-210 GPa. Aptly the elastic modulus of the metallic material could be 190-210 GPa. The bridging element $508_{1,2}$ may alternatively be of a relatively high elastic modulus polymeric or composite material. Such relatively high elastic modulus polymers could include PVDF materials with an elastic modulus greater than 400 MPa when measured at room temperature. Aptly the elastic modulus of the polymer material could be greater than 800 MPa. Aptly the elastic modulus of the polymer material could be greater than 1000 MPa. Aptly the elastic modulus of the composite material could be 20-50 GPa. Aptly the elastic modulus of the composite material could be 70 to 80 GPa.

As can be seen in FIG. 5, the cross section profile of the pressure armour tape 501 is substantially Z shaped with a rectangular main body and a leading edge and a trailing edge. Of course the pressure armour tape, or armour tape may have other cross sectional profiles, e.g. C clip, I shaped, T shaped, X shaped or K shaped. With other profiles, the bridging element can be configured appropriately to bridge a gap between adjacent windings.

In this particular embodiment the cross section of the elongate tape 508 is approximately rectangular with a protrusion or body portion 510 extending radially outwards into at least a portion of the gap 512 between the edges 504, 505 of adjacent windings 501. It can be seen from FIG. 5 that the elongate tape has an approximately inverted T shaped cross sectional profile. The bridging element 508 is arranged to extend at least partially across the gap 512 and between the inner surface 503 of the pressure armour layer and the outer surface 514 of the adjacent fluid retaining layer 502 such that the fluid retaining layer 502 is prevented from creeping into the gap 512.

Figure 16A:
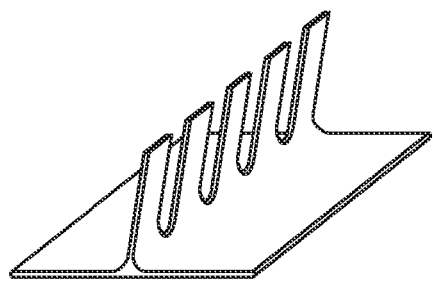
FIGS. 16a and 16b illustrate an alternative embodiment of the present invention.
Figure 16B:
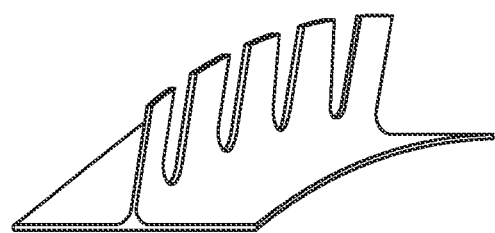

The body portion 510 of the bridging element 508 is configured to be located in the gap 512 between adjacent collapse resistant tape windings 501. The body portion extends radially outwards along the gap 512 to thereby help to maintain the position of the elongate tape 508 within the gap and maintaining the alternating winding configuration. In other embodiments, the body portion 510 may be configured to have regular slits or slots along its length in order to allow the strip to bend more easily and form more consistently around the fluid retaining layer 502 (as shown in FIGS. 16a and 16b).

The bridging element 508 also includes two wing portions $516_{1,2}$, extending from an end region of the body portion 510, that span the width of the gap 512 and extend axially beyond the gap such that the radially outer surface 518 of the wing portions $516_{1,2}$ abuts the radially inner surface 503 of the adjacent collapse resistant tape windings 501. A substantially flat radially inner surface 520 of the wing portions $516_{1,2}$ abuts with the radially outer surface 514 of the fluid retaining layer 502. In this way the fluid retaining layer is prevented from creeping into the gap 512 when it is subject to internal pressure. The wing portions are designed to be relatively thin so as to not interfere greatly with the distance between the polymer barrier layer 502 and the pressure armour layer 501, yet strong enough to retain their position and prevent ingress of polymer into the gap 512.

In the embodiment shown in FIG. 5 an optional transitional curved surface between respective wing portions and the body portion is configured such that the surface has a radius of curvature approximately equal to that of a curved corner between the radially inner surface 503 and the respective side walls 504, 505 of the collapse resistant tape windings 501.

It will be appreciated that in use, a flexible pipe body is subject to bending forces with currents, vessel movement and the like. As the flexible pipe body bends, the width of the gap 512 between adjacent windings of collapse resistant tape will change. At the outer radius of a bend the gap width will generally increase, while at the inner radius of the bend, the gap width will generally decrease. It is therefore preferable for the wing span of the wing portions (i.e. the full width of the two wing portions from the outermost end of a first wing to the outermost end of a second wing) to be larger than the maximum possible width of the gap 512. As such, the wing portions prevent the entire bridging element from moving into the gap area 512. Aptly, the wing span of the wing portions is about 3 times a maximum gap width between the collapse resistant tape windings.

Because of the cross sectional profile of the elongate tape element 508, when the collapse resistant windings are moved closer together, the transitional curved surface of the bridging element will correspond with a curved corner of a collapse resistant wire. Therefore, further stresses between adjacent tape elements are minimised.

Figure 9:
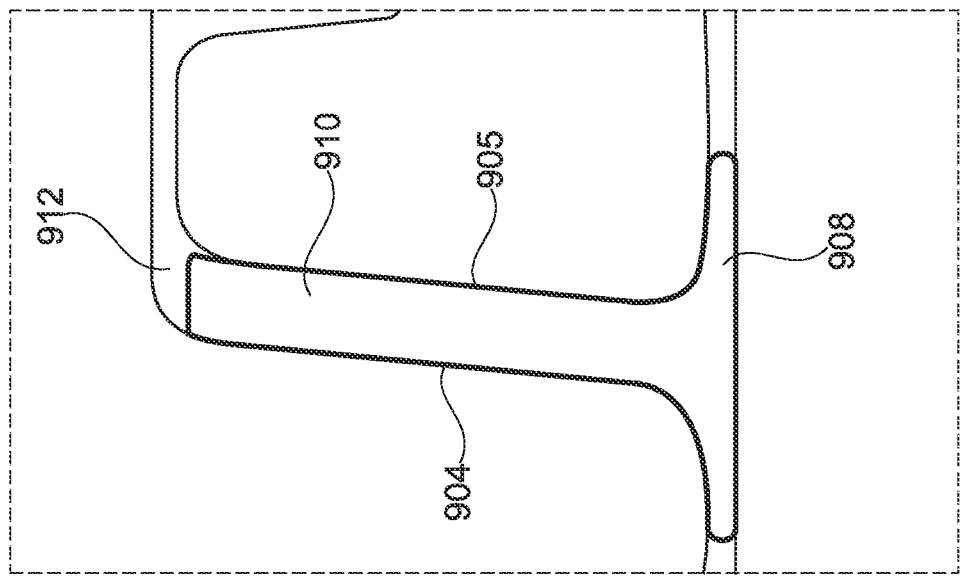
FIG. 9 illustrates an alternative embodiment of the present invention.
Figure 8:
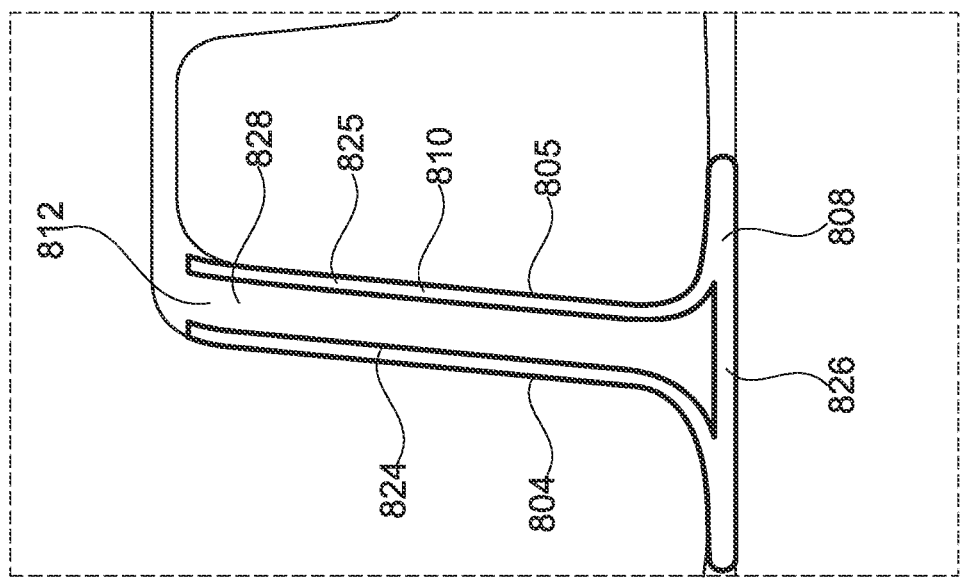
FIG. 8 illustrates an alternative embodiment of the present invention.

Other embodiments of the present invention are illustrated in FIGS. 7 to 9 wherein a cross section of the body portion of the bridging element has an alternative shape.

The bridging element 708 of FIG. 7 is approximately an inverted 'T-shape'. The bridging element 708 includes wing portions similar to those described above in relation to bridging element 508 and will therefore not be described again in detail. A body portion 710 of the bridging element 708 extends along the length of the gap 712, substantially along the full length of the gap in this embodiment. Wing portions extend axially from an end of the body portion 710 similarly to FIG. 6. The body portion 710 is configured such that sides 721 and 722 will abut with respective side walls 704 and 705 of the adjacent collapse resistant tape windings when the gap 712 between the windings decreases.

Figure 17A:
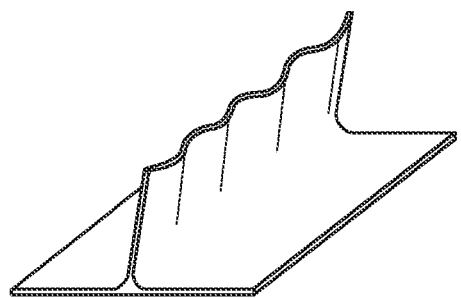
FIGS. 17a and 17b illustrate an alternative embodiment of the present invention.
Figure 17B:
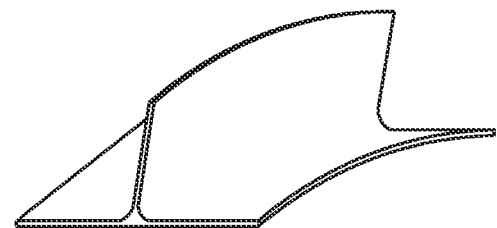

It will be realised that the radial length of the body portion 710 may be different to that shown, for example extending about 90%, or 80%, or 70%, or 60%, or 50%, or 40%, or 30%, or 20%, or 10%, or 2%, along a radial length of the gap 712, and may be discontinuous or vary in radial length along the elongate length of the bridging element. Likewise, the width of the body portion may also be different to the relatively thin width shown, extending about 100%, or 90%, or 80%, or 70%, or 60%, or 50%, or 40%, or 30%, or 20%, or 10%, or 2% of the maximum gap width between adjacent windings. In an alternative embodiment, the body portion 710 of the elongate bridging element may contain a wave or non-linearity formed into it when laid on a flat surface so that when the bridging element is formed around the barrier layer 502, with the surfaces 514 and 520 in contact, the waviness in the body portion is removed due to the higher circumferential strain at the upper radial end of the body portion compared with the lower radial end of the body portion (as shown in FIGS. 17a and 17b).

FIG. 8 shows a further embodiment of a bridging element/ elongate tape element 808 having an approximately inverted 'T-shape'. Here, the body portion 810 has an approximate U-shaped profile, with a first side portion 824, a base portion 826 and a further side portion 825. Wing portions extend from the base portion 826 of the body portion 810, similarly to FIG. 6.

In this embodiment, the first side portion 824 and further side portion 825 abut with respective side walls 804, 805 of adjacent collapse resistant tape windings. Here the first side portion 824 and further side portion 825 extend substantially along the full length of the gap 812.

The first side portion 824 and further side portion 825 can be considered as prongs. The prongs should be of a material capable of a degree of flexibility, such as steel or a relatively high elastic modulus polymeric material, such that as adjacent collapse resistant tape windings move closer together, the prongs can bend from near the base portion 826 to move closer together at an open end portion 828. Such relatively high modulus polymers could include some PVDF materials, composites or alloys with an elastic modulus greater than 400 MPa when measured at room temperature. Aptly the elastic modulus of the polymer material could be greater than 800 MPa. Aptly the elastic modulus of the polymer material could be greater than 1000 MPa. Aptly the elastic modulus of the composite material could be 20-50 GPa. Aptly the elastic modulus of the composite material could be 70-80 GPa. Aptly the elastic modulus of a metallic material of the prongs could be 170-210 GPa. Aptly the elastic modulus of the metallic material could be 190-210 GPa.

FIG. 9 shows a further embodiment of a bridging element/elongate tape element 908 having an approximately inverted 'T-shape'. The bridging element 908 has a similar cross sectional profile to the embodiment shown in FIG. 7. However, the body portion 910 is wider than that of the embodiment of FIG. 7, being approximately the width of the maximum gap width 912.

In this embodiment the bridging element is at least partially compressible, yet with sufficient strength to prevent substantial ingress of a polymer barrier layer into the gap 912. The bridging element may be non-metal, a polymer, an elastomer, a rubber, a foam, or any other resilient material suitable to be temporarily compressed when adjacent windings of collapse resistant tape move closer together, or be constructed from an internal skeleton structure such as 710 or 810 while being encapsulated by, or encapsulating a suitably compressible resilient material as described above. Suitably compressible materials could have an elastic modulus considerably less than 400 MPa, for instance 150 MPa, for instance 50 MPa, for instance 10 MPa, for instance 1 MPa, for instance 0.08 MPa, and may be a rubber or foamed material. Although the body portion 910 has a width of up to the maximum gap width, if the gap 912 were to decrease in width (such as during bending of a pipe), the compressibility of the material used for the bridging element allows the bridging element to expand and contract in line with the changing gap width.

Of course it will be realised that the radial length of the body portion may be different to that shown, for example extending about 90%, or 80%, or 70%, or 60%, or 50%, or 40%, or 30%, or 20%, or 10%, or 2%, along a radial length of the gap 912, and may be discontinuous or vary in radial length along the elongate length of the bridging element.

Figure 10A:
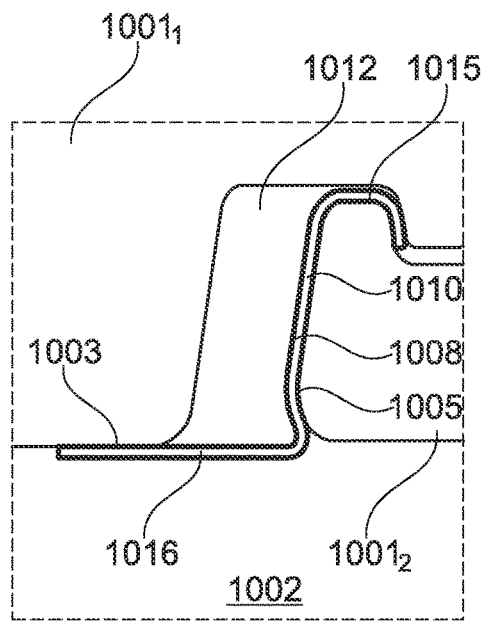
FIGS. 10a, 10b and 10c illustrate an alternative embodiment of the present invention.
Figure 10B:
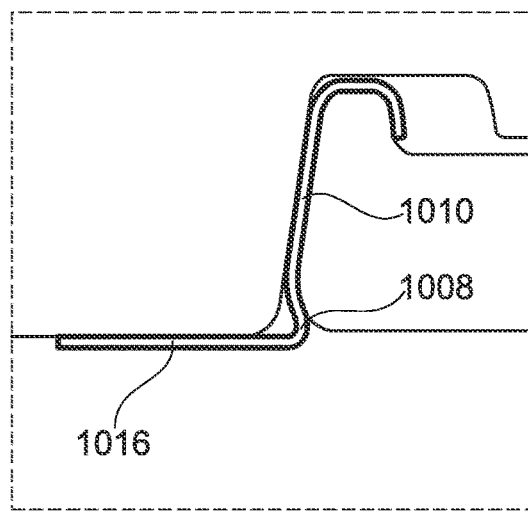

FIGS. 10a and 10b show a yet further embodiment of a bridging element/elongate tape element 1008 having an approximately 'S-shape'. FIG. 10a shows the positioning of the bridging element 1008 when the collapse resistant tape windings $1001_{1,2}$ are arranged such that the width of the gap 1012 is at its maximum. The bridging element 1008 has a body portion 1010 that extends along the gap 1012 abutting with a side wall 1005 of the adjacent collapse resistant tape winding $1001_2$. The body portion continues to form a hooked end region 1015, which is substantially hook shaped so as to accommodate a trailing edge of the adjacent collapse resistant tape winding $1001_2$. The hooked end region 1015 thereby acts to help the bridging element 1008 remain in place with the body portion 1010 abutting the side wall 1005.

The bridging element 1008 further includes a wing portion 1016 that extends from an end region of the body portion to thereby span the maximum width of the gap 1012. The wing portion 1016 further extends between an inner surface 1003 of the collapse resistant tape winding $1001_1$ and an outer surface of a fluid retaining layer 1002. The wing portion 1016 is larger than the maximum gap width, and aptly 125%, or 150%, or 200%, or 300% of the maximum gap width.

As such, the body portion is effectively connected or attached to one adjacent winding of the pressure armour layer so that it is unable to stray from that position and will remain always adjacent to that side winding whether the gap width is large or small. The wing portion is wide enough such that even at the maximum gap width, the gap is bridged by the wing portion. Physical attachment means such as adhesive may also be used to connect or help connect in lieu of or in addition to the hooked end region of the bridging element to the adjacent pressure armour winding.

FIG. 10b shows the positioning of the bridging element 1008 when the collapse resistant tape windings $1001_{1,2}$ are arranged such that the width of the gap 1012 is at its minimum. In this arrangement the body portion 1010 abuts with side walls of each adjacent collapse resistant tape winding. The wing portion is positioned similarly to in FIG. 10a, but a larger portion lies between the inner surface of the collapse resistant tape winding and the outer surface of the fluid retaining layer.

In this particular embodiment the elongate tape element 1016 has a substantially uniform thickness across the cross-sectional profile. That is, the wire/sheet forming body portion 1010 and the wing portion 1016 is of uniform thickness.

Figure 11A:
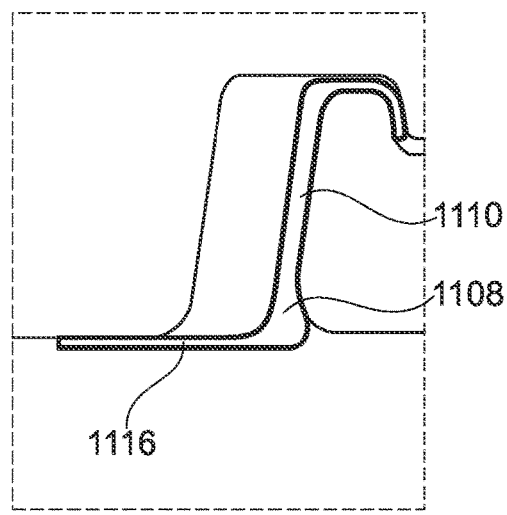
FIGS. 11a, 11b and 11c illustrate an alternative embodiment of the present invention.
Figure 11B:
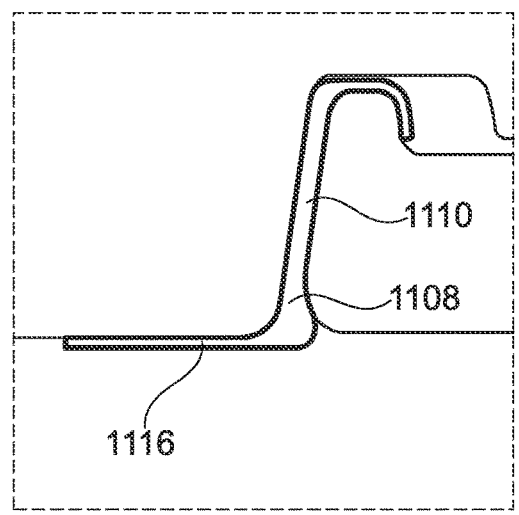

FIGS. 11a and 11b show a similar embodiment in which the thickness across the cross-sectional profile of the bridging element is not uniform. In this embodiment a body portion 1110 of a bridging element 1108 is thicker than a wing portion 1116.

Figure 10C:
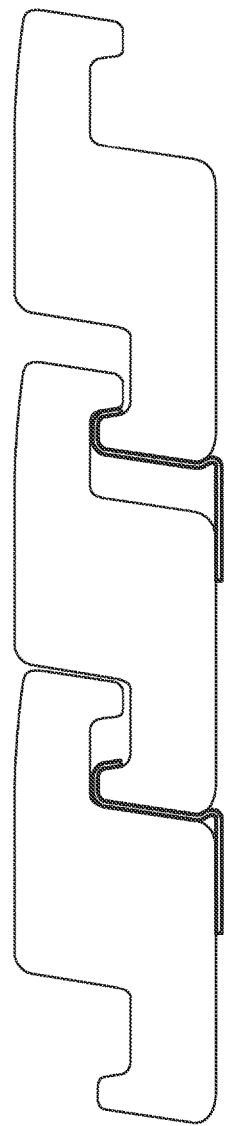
Figure 11C:
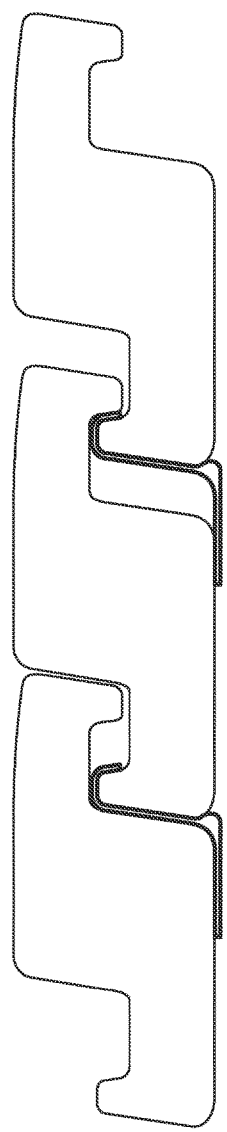
Figure 12A:
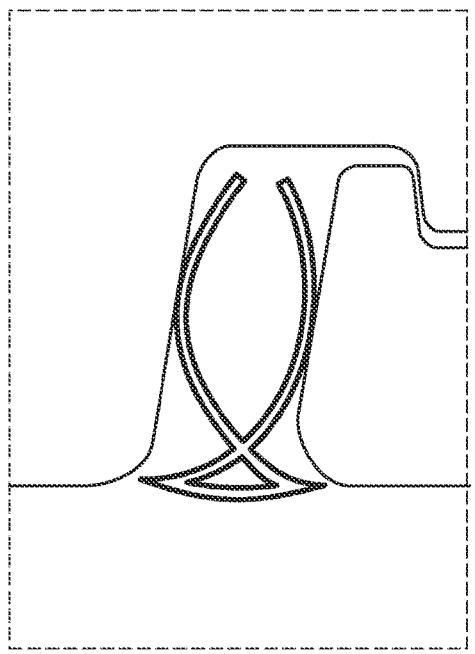
FIGS. 12a, 12b and 12c illustrate an alternative embodiment of the present invention.
Figure 12B:
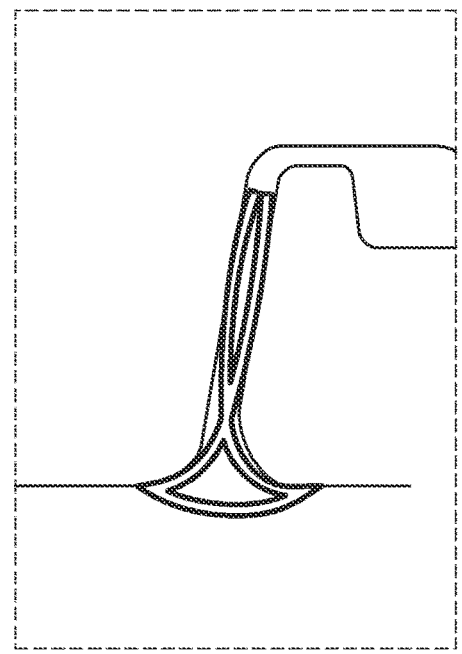
Figure 13A:
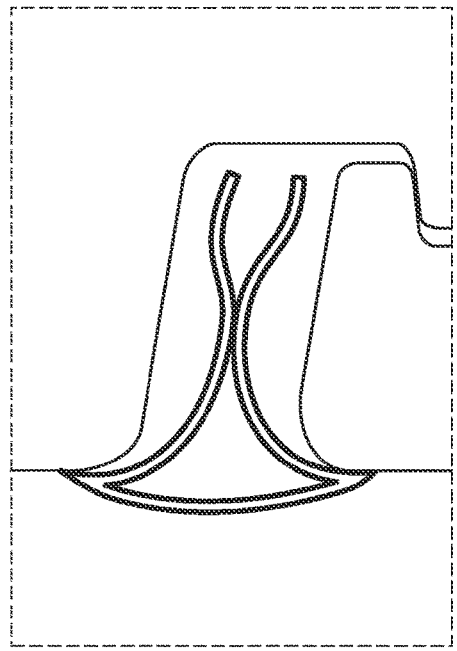
FIGS. 13a, 13b and 13c illustrate an alternative embodiment of the present invention.
Figure 13B:
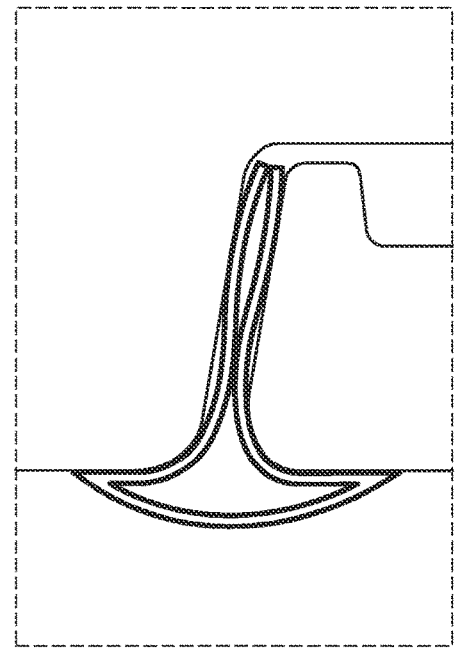
Figure 12C:
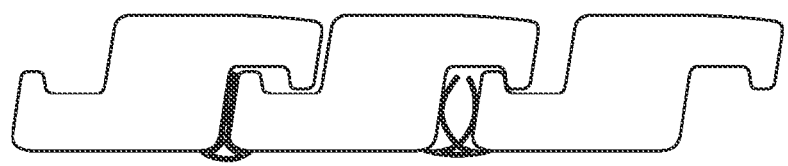
Figure 13C:
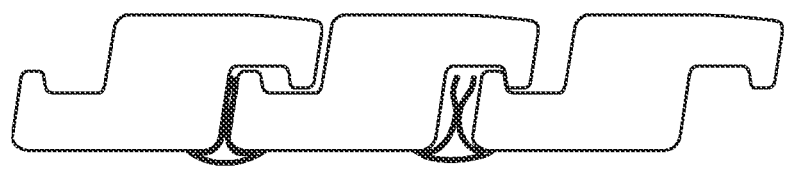

In the embodiments of FIGS. 10a, 10b, 11a and 11b, the body portion and wing portion are shaped to accommodate the curvature of the adjacent pressure armour layer windings (as can be seen in FIGS. 10c and 11c). In each case the wing portion will always extend across the full gap width to prevent any point of ingress for the polymer barrier layer into the gap between windings.

A flexible pipe body may be formed with any of the above-described bridging elements.

During manufacture of a flexible pipe body, a fluid retaining layer is provided. This may be a polymer layer or formed from metals or composites, for example. If a polymer is used, the polymer may be extruded using techniques known in the art to form a tubular polymer layer.

Then, an elongate tape element (as per any of the above embodiments) and a collapse resistant tape (e.g. pressure armour wires) are helically wound over the fluid retaining layer to form alternate windings. The elongate tape element is located at least partially within a gap between adjacent collapse resistant tape windings and configured to span the gap so as to abut with a radially inner surface of each adjacent collapse resistant tape winding.

Various modifications to the detailed designs as described above are possible. For example, although the wing portions have been described above with a substantially uniform thickness, the wing portions may be tapered away from the body portion such that while the radially inner surface of the bridging element remains substantially flat to abut with the fluid retaining layer, the radially outer surface may taper or be shaped to correspond with an adjacent collapse resistant tape winding.

An alternative embodiment is for a spring or clip of material to be configured to locate in the gap between, and/or around the collapse resistant tape wraps, as shown in FIGS. 12a, 12b, 12c, 13a, 13b, 13c. Such spring or clips would function in a similar manner to the embodiment shown in FIG. 8.

Figure 14:
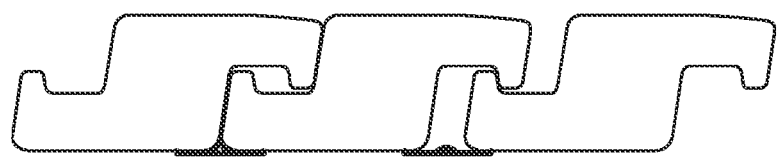
FIG. 14 illustrates an alternative embodiment of the present invention.
Figure 15A:
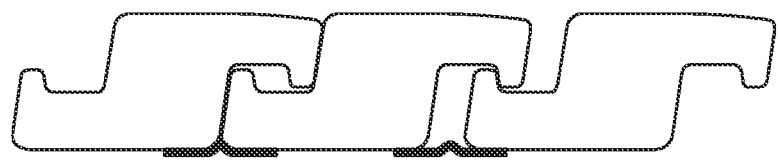
FIGS. 15a and 15b illustrate an alternative embodiment of the present invention.
Figure 15B:

A further alternative embodiment is shown in FIGS. 14, 15a and 15b. These are similar to the embodiment shown in FIG. 5, with slight changes to the design of the body portion.

Although metal has been specified for forming the bridging element, this could be any suitable material with sufficient strength and properties to perform as required. The element may comprise metal, aluminium alloy, non-metal, a polymer, an elastomer, a rubber, a foam or a combination of these, for example a coated metallic sheet, the coating to provide corrosion protection and or wear resistance and or low coefficient of friction (for example 1, 0.5, 0.1, or 0.05).

Although the bridging elements have been described and shown with a body portion of various lengths, this body portion length may be other suitable lengths.

The armour layer formed as described above may be used in conjunction with any or all of the other flexible pipe body layers as described with reference to FIG. 1.

With the above-described arrangements crazing of a barrier layer or liner due to plastic deformation of the layer (plastic hoop strain) is mitigated or prevented.

With the above-described arrangements ingress or creep of a barrier layer or liner into gaps between armour windings can be substantially prevented.

With the above-described arrangements, the body portion and wing portion or portions are arranged such that even at a maximum gap width, and even with the body portion located in its most extreme position abutting a left side wall or right side wall, the gap between windings will still be covered by the wing portion(s) and optionally also the body portion.

It will be clear to a person skilled in the art that features described in relation to any of the embodiments described above can be applicable interchangeably between the different embodiments. The embodiments described above are examples to illustrate various features of the invention.

As used herein, the term "collapse resistant layer" or "collapse resistant wire" or similar terms have been used to broadly identify one layer or wire of a pipe body provided to resist collapse of the pipe body or resist pressure applied to the pipe body (external or internal pressure). As described above, such collapse resistant layers may be a pressure armour layer or a carcass layer, for example.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. An elongate tape element for forming a helically wound layer of windings in flexible pipe body of an unbonded flexible pipe for transporting fluids from a deep water subsea location, the elongate tape element being configured for alternate winding with a collapse resistant tape in a helical manner to form a collapse resistant layer, wherein the elongate tape element has a cross-sectional profile comprising:
   a body portion for being positioned between collapse resistant tape windings such that the body portion lies at least partially in a gap between adjacent collapse resistant tape windings; and
   only a single wing portion extending from an end region of the body portion;
   wherein the body portion lies in the gap and abuts a side wall of a collapse resistant tape winding;
   wherein the only single wing portion is configured to span the gap and abut with a radially inner surface a collapse resistant tape winding; and
   wherein the elongate tape element has a substantially uniform thickness across the cross-sectional profile.

2. The elongate tape element as claimed in claim 1 wherein the body portion abuts a respective side wall of each adjacent collapse resistant tape winding.

3. The elongate tape element as claimed in claim 1 wherein a wing span of the only single wing portion is about 3 times a maximum gap width between the collapse resistant tape windings.

4. The elongate tape element as claimed in claim 1 wherein the body portion extends at least 2% along a radial length of the gap.

5. The elongate tape element as claimed in claim 1 wherein the body portion is at least partly discontinuous or varies its radial length along the elongate tape element.

6. Flexible pipe body for transporting fluids from a deep water subsea location, comprising a collapse resistant layer having an elongate tape element as claimed in claim 1, the elongate tape element being alternately wound with a collapse resistant tape in a helical manner.

* * * * *